US008856147B1

(12) United States Patent
Tran (10) Patent No.: US 8,856,147 B1
(45) Date of Patent: Oct. 7, 2014

(54) METHOD OF SORTING DATA ON A LIMITED RESOURCE COMPUTER

(75) Inventor: Thomas H. Tran, Kent, WA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 12/885,431

(22) Filed: Sep. 17, 2010

(51) Int. Cl.
*G06F 17/30* (2006.01)

(52) U.S. Cl.
USPC .......................................... 707/752

(58) Field of Classification Search
USPC .................. 707/748, 749, 752, 753
See application file for complete search history.

(56) References Cited

U.S. PATENT DOCUMENTS 5,369,762 A * 11/1994 Wolf ..................................... 1/1
7,895,216 B2 * 2/2011 Longshaw et al. ............ 707/752

OTHER PUBLICATIONS

Yong He et al., Delay-range-dependent stability for systems with time-varying delay, Aug. 18, 2006, ScienceDirect. (Available online at www.sciencedirect.com), 371-376.*
Sardar Zafar Iqbal et al., Incremental Sorting Algorithm, 2009, IEEE, vol. 2, 378-381.*
"Sorting algorithm", Wikipedia, http://en.wikipedia.org/wiki/Sorting_algorithm, accessed Apr. 26, 2011.
http://en.wikipedia.org/wiki/Sorting_algorithm, Sep. 28, 2010.

* cited by examiner

*Primary Examiner* — Jean B Fleurantin
(74) *Attorney, Agent, or Firm* — Ameh IP; Lowell Campbell; Elahe Toosi (57) ABSTRACT

A method of sorting data on a limited resource computer is disclosed. Data recording characteristics associated with a data set are determined. A sort-table size is calculated based on the data recording characteristics, and the data set is sorted based on the sort-table size.

20 Claims, 5 Drawing Sheets

FIG. 1

|  | 200 |
| --- | --- |

| TIME | SRC A | SRC B | SRC C |
| --- | --- | --- | --- |
| T1 | a1 | b1 | c1 |
| T2 |  |  | c2 |
| T3 |  | b3 | c3 |
| T4 | a4 |  | c4 |
| T5 |  | b5 | c5 |
| T6 |  |  | c6 |
| T7 | a7 | b7 | c7 |
| T8 |  |  | c8 |
| T9 |  | b9 | c9 |
| T10 | a10 |  | c10 |
| T11 |  | b11 | c11 |
| T12 |  |  | c12 |
| T13 | a13 | b13 | c13 |

202 → TIME, 204 → SRC A, 206 → SRC B, 208 → SRC C

FIG. 6

METHOD OF SORTING DATA ON A LIMITED RESOURCE COMPUTER

GOVERNMENT RIGHTS

This invention was made with Government support under N00019-04-C-3146 awarded by the Department of Defense. The government has certain rights in this invention.

FIELD

Embodiments of the present disclosure relate generally to data sorting. More particularly, embodiments of the present disclosure relate to sorting a large amount of data on a limited resource computer.

BACKGROUND

Electronic data sorting has a history dating back to the first electronic computers. A sorting method generally takes a data set with a first permutation order and transforms the data set into a second permutation order designated by a user of the sorting method. A particular order is generally determined by an individual tag called a sorting key associated with each datum of the data set. For example, the sorting key may comprise, all of the datum, a part of the datum, or a separate datum associated with the datum. While numerous methods of sorting have been developed, useful new sorting algorithms are still being developed, and specially designed sorting methods may be useful for some applications.

SUMMARY

A method of sorting data on a limited resource computer is disclosed. Data recording characteristics associated with a data set are determined. A sort-table size is calculated based on the data recording characteristics, and the data set is sorted based on the sort-table size. The method provides a data partition methodology such that sorting of a large amount of data can be done on a typical office computer efficiently. In this manner, data may be sorted quickly on a limited resource computer; thereby a significant amount of time and cost can be saved.

In a first embodiment, a data sorting system comprises a data handler module operable to determine data recording characteristics associated with a data set, a computational module calculates a sort-table size based on the data recording characteristics and sorts the data set based on the sort-table size.

In a second embodiment, a method of sorting data determines data recording characteristics associated with a data set, and calculates a sort-table size based on the data recording characteristics. The method further sorts the data set based on the sort-table size.

In a third embodiment, a computer readable medium comprises program code. The program code determines data recording characteristics associated with a data set, and calculates a sort-table size based on the data recording characteristics. The program code further sorts the dataset based on the sort-table size.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to sorting, data acquisition, data storage, computation, and other functional aspects of the systems (and the individual operating components of the systems) may not be described in detail herein. In addition, those skilled in the art will appreciate that embodiments of the present disclosure may be practiced in conjunction with a variety of computational machines, and that the embodiments described herein are merely example embodiments of the disclosure.

Embodiments of the disclosure are described herein in the context of a practical non-limiting application, namely, sorting accumulated sensor data. Embodiments of the disclosure, however, are not limited to such sensor data applications, and the techniques described herein may also be utilized in other data sorting applications. For example but without limitation, embodiments may be applicable to synchronizing sporting event video from multiple cameras, synchronizing video from multiple closed circuit television (CCTV) cameras, synchronizing audio files from a recorded concert, sorting a healthcare database by social security number, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
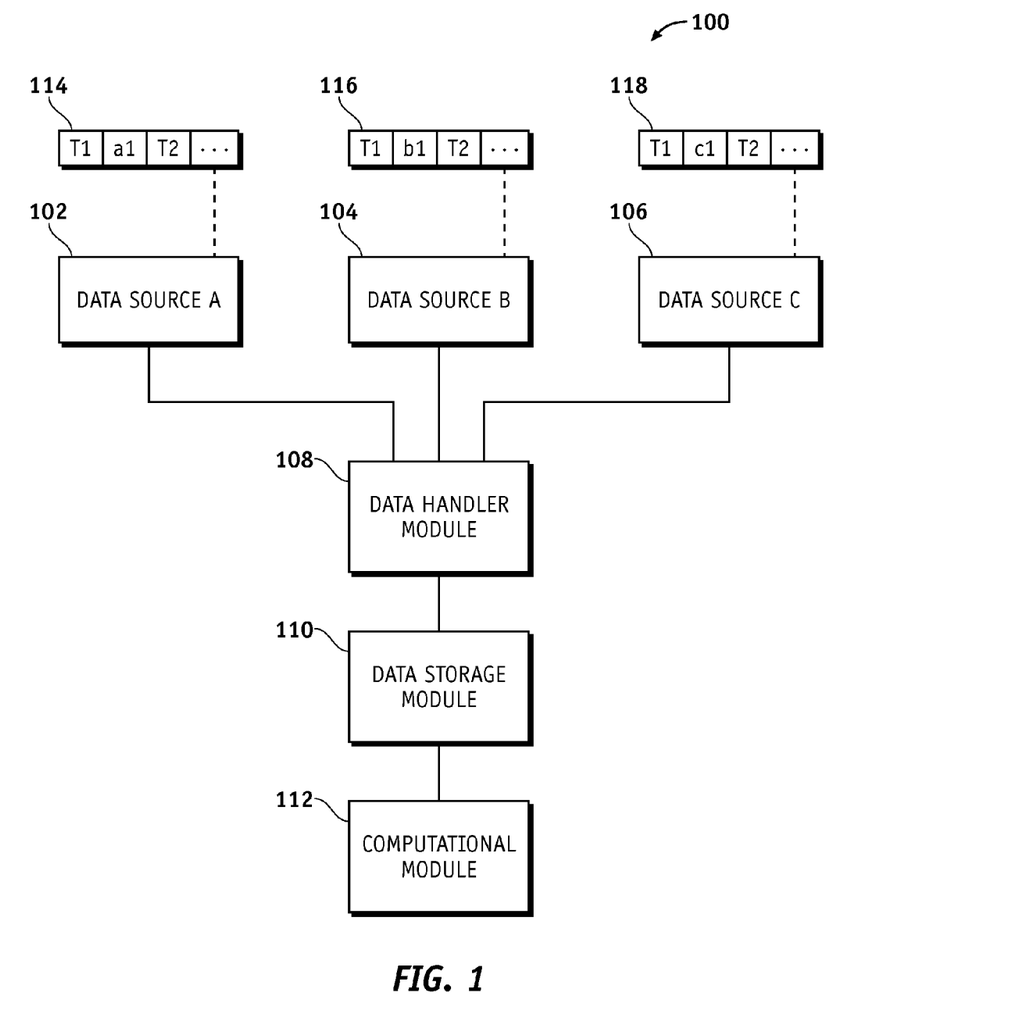
FIG. 1 is an illustration of an exemplary functional block diagram of a data sorting system according to an embodiment of the disclosure.

FIG. 1 is an illustration of an exemplary functional block diagram of a data sorting system 100 according to an embodiment of the disclosure. The data sorting system 100 comprises a plurality of data sources 102/104/106, a data handler module 108, a data storage module 110, and a computational module 112.

The data sources 102/104/106 are configured to receive and store data. For the embodiment shown in FIG. 1, three data sources 102/104/106 are used; however, in other practical embodiments, any number of data sources may be used, for example but without limitation, three, hundreds, thousands, and the like. The data sources 102/104/106 may comprise a variety of different data recording characteristics as explained in more detail in the context of discussion of FIG. 2 below.

In this example embodiment, the data sources 102/104/106 comprise sensors of an unmanned aerial vehicle (UAV) that receive data streams 114/116/118 respectively. The data streams 114/116/118 may comprise, for example but without limitation, photographic images, audio data, video data, and the like, each at a respective periodic frequency. The data streams 114/116/118 may each comprise a time stamp for a time in the respective periodic frequency when their respective datums are sent. For example, the data streams 114/116/118 may comprise a time stamp (T1, T2 . . . ) for each of the datums (a1, b1, c1 . . . ) in the data streams 114/116/118. In this manner, the data source 102 may comprise photographic images sent in the data stream 114 every 3 minutes, so the data stream 114 comprises datums (a1, a4, a7 . . . ) at time stamps (T1, T4, T7 . . . ) respectively. The data source 104 may comprise audio data sent in the data stream 116 every 2 minutes, so the data stream 116 comprises datums (b1, b3, b5 . . . ) at time stamps (T1, T3, T5 . . . ) respectively. The data source 106 may comprise video data sent in the data stream 118 every minute, so the data stream 118 comprises datums (c1, c2, c3 . . . ) at time stamps (T1, T2, T3 . . . ) respectively.

The data handler module 108 receives the data streams 114/116/118 from the data sources 102/104/106 respectively and stores each of the datums from the data streams 114/116/118 as they arrive in a data set (200 in FIG. 2) in the data storage module 110. Each of the data streams 114/116/118 from each of the data sources 102/104/106 is handled exclusively by a single process or a lightweight thread within a process, called a data handler. All data handlers are responsible to write the data from each of the data streams 114/116/118 to the data set 200 independently. Each data handler guarantees the datums from the data streams 114/116/118 for each of the sources 102/104/106 is written out (recorded) to the data set 200 in a correct chronologic order. However, the written chronological order between datums from the data streams 114/116/118 of different data sources 102/104/106 is not preserved; as explained in more detail below in the context of discussion of FIG. 2. In other words, the data recorded from the different data sources 102/104/106 are in a substantially random order with respect to one another as far as the timestamp (T1, T2 . . . ) is concerned.

The data storage module 110 may be any suitable data storage area with a suitable amount of memory that is formatted to support the operation of the system 100. Data storage module 110 is configured to store, maintain, and provide data as needed to support the functionality of the system 100 in the manner described below. In practical embodiments, the data storage module 110 may comprise, for example but without limitation, a non-volatile storage device (non-volatile semiconductor memory, hard disk device, optical disk device, and the like), a random access storage device (for example, SRAM, DRAM), or any other form of storage medium known in the art. The non-volatile memory may be used for storing instructions to be executed by the computational module 112. The data storage module 110 may be coupled to the computational module 112 and configured to store, for example but without limitation, datums 114/116/118, and the like. The data storage module 110 may also store, a computer program that is executed by the computational module 112, an operating system, an application program, tentative data used in executing a program processing, and the like. The data storage module 110 may be coupled to the computational module 112 such that the computational module 112 can read information from and write information to data storage module 110. As an example, the computational module 112 and data storage module 110 may reside in their respective ASICs. The data storage module 110 may also be integrated into the computational module 112. In an embodiment, the data storage module 110 may comprise a cache memory for storing temporary variables or other intermediate information during execution of instructions to be executed by the computational module 112.

The computational module 112 is configured to support functions of the system 100 so that processes of the system 100 are suitably performed. These processes comprise, for example but without limitation, control of input/output data signals (not shown) to/from the data sources 102/104/106, data manipulation, storing data in the data storage module 110, and the like. The computational module 112 access the data storage module 110 to partition (i.e., divide in to segments) the data set such that a substantially large amount of data can be sorted quickly. In this manner, the computational module 112 saves a significant amount of time and memory storage size for sorting a large amount of data as explained in more detail below. The computational module 112, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the computational module 112 comprises processing logic that is configured to carry out the functions, techniques, and processing tasks associated with the operation of system 100. In particular, the processing logic is configured to support the data sorting method described herein.

Figure 2:
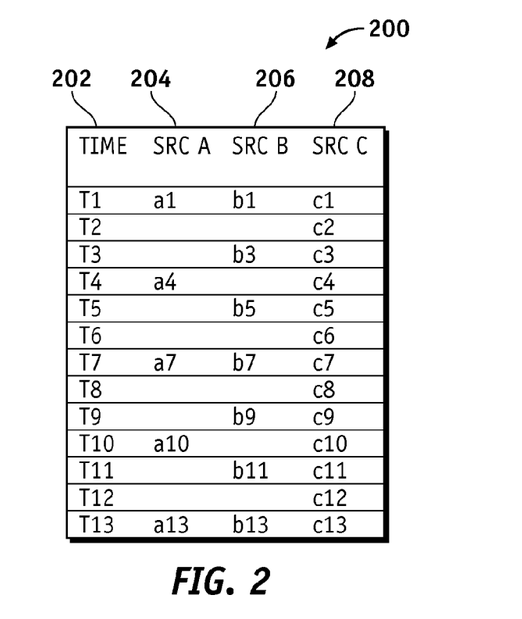
FIG. 2 is an illustration of an exemplary data set according to an embodiment of the disclosure.

FIG. 2 is an illustration of an exemplary data set 200 according to an embodiment of the disclosure. Data of the data set 200 may comprise a variety of data recording characteristics, for example but without limitation, data subset cardinality, maximum data time delay offset, a data set size, and the like.

The data subset cardinality corresponds to the number of the data subsets in the data set 200 from each of the data streams 114/116/118 from the data sources 102/104/106. The data set 200 comprises data subsets "a" from the data source 102 comprising datums a1, a4, a7, a10, a13, "b" from the data source 104 comprising datums b1, b3, b5, b7, b9, b11, b13, and "c" from data source 106 comprising datums c1-c13. The data subsets from data sources 102/104/106 are labeled as subsets SRC A 204, SRC B 206, and SRC C 208 in the data set 200 respectively. Each of the data sources 102/104/106 sends datums a, b, and c of the corresponding data subsets to the data handler module 108 at a given time stamp 202. For illustration purposes, a number after the datums a, b or c represents the time stamp 202 associated with the data items a, b, and c of each data subset "a", "b", "c". For example: at time stamp T1 the data handler module 108 receives datums a1, b1 and c1 from the data sources 102/104/106 respectively; at time stamp T2, the data handler module 108 receives datum c2 from the data source 106; at time stamp T3, the data handler module 108 receives datums b3 and c3 from the data sources 104 and 106 respectively; at time stamp T4, the data handler module 108 receives datums a4 and c4 from the data sources 102 and 106 respectively; and so on.

The maximum data time delay offset corresponds to a largest period or frequency of the data streams 114/116/118 from the data sources 102/104/106. A data time delay offset is a largest time difference between received datums from each of the data sources 102/104/106 respectively. A maximum data time delay offset (M) is a largest of the data time delay offsets. For example, a data time delay offset for subset SRC A 204 is 3, a data time delay offset for subset SRC B 206 is 2, and a data time delay offset for subset SRC C 208 is 1. A maximum data time delay offset for subsets SRC A 204, SRC B 206, and SRC C 208 is 3. The data sources 102/104/106 may send data synchronously or asynchronously. Thus, the datums may be received with a periodic frequency or with no periodic frequency.

The data set size depends on, for example but without limitation, the application, the available resource, and the like. Given a small data set, the small data set in its entire can be loaded into a computer memory and sorted then after. However, in practice, a typical computational system may comprise hundreds or more data sets received from various data sources. For example, for 100 data sources, a data rate of each data source of 100 datums per second, each datum having 128 bytes, and the recording time of 4 hours (i.e., of a flight test), then a total file size for storing the data is at least about 18 gigabytes(GB). In this manner, a total of 1.4 billion datums is stored in a recorded file. Loading the entire 18 GB in a typical office computer (i.e., Personal Computer (PC)) having 4 GB Random Access Memory (RAM) may not be a viable option. A data analysis requirement may be to sort substantially all the datums in a chronological order using a typical office computer so that an analysis engineer can correlate substantially all the data in the correct order quickly. The sorting technique described in the embodiments of the disclosure allow a typical office computer with limited resources (e.g., RAM) to sort a large number of data sets.

The data set 200 may comprise the datums in a written data order of: a1 a4 b1 a7 c1 b3 c2 c3 a4 c5 c6 b5 b7 c7 a10 c8 c9 b9 b11 c10 a13 c11 b13 c12 c13. Since data in each of the data subsets SRC A 204, SRC B 206, and SRC C 208 is received separately, a chronological order within each "a" (a1, a4, a7, a10, a13), "b" (b1, b3, b5, b7, b9, b11, b13) or "c" (c1-c13) data subset is in a respective correct order (rows of the table of data set 200). However, the datums a, b, and c of each data subset "a", "b", and "c" are not chronologically stored with respect to each other. For example, the datum a4 is written to the data set 200 before the datum b1. A preferred ordering of the datums may be: a1 b1 c1 c2 c3 b3 a4 c4 c5 b5 c6 c7 b7 c7 c8 c9 b9 a10 c10 b11 c11 c12 a13 b13 c13, where all time stamps 202 are in a correct order. A typical data extraction chronological order would be that as long as the number follows the letter "a", "b" or "c" are the same then it does not matter which data set is returned first. For example, a1 b1 c1 or c1 b1 a1 are both in a correct order. Thus, a preferred sorting method would sort the time stamp 202, but be agnostic to an order between subsets.

Figure 3:
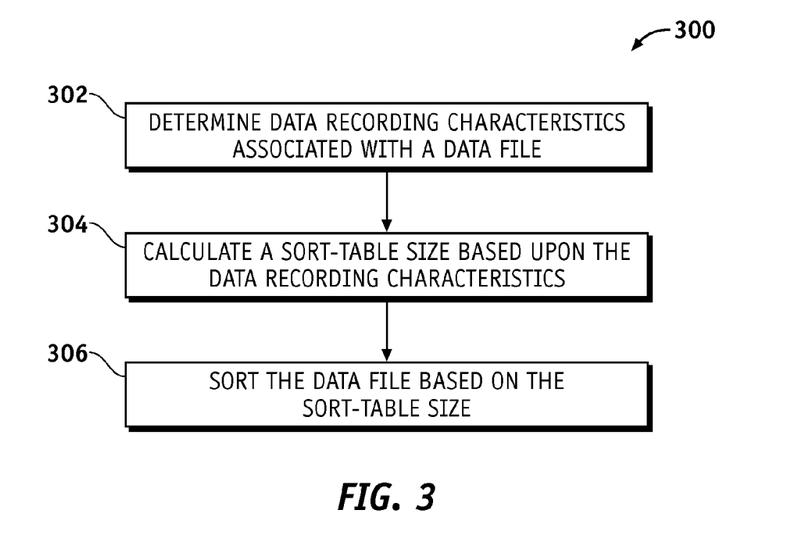
FIG. 3 is an illustration of an exemplary flow chart showing a data sorting process according to an embodiment of the disclosure.

FIG. 3 is an illustration of an exemplary flow chart showing a data sorting process 300 according to an embodiment of the disclosure. The various tasks performed in connection with process 300 may be performed, by software, hardware, firmware, a computer-readable medium having computer executable instructions for performing the process method, or any combination thereof. The process 300 may be recorded in a computer-readable medium such as a semiconductor memory, a magnetic disk, an optical disk, and the like, and can be accessed and executed, for example, by a computer CPU such as the computational module 112 in which the computer-readable medium is stored. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. For illustrative purposes, the following description of process 300 may refer to elements mentioned above in connection with FIGS. 1-2. In practical embodiments, portions of the process 300 may be performed by different elements of the data sorting system 100 such as: the data handler module 108, the data storage module 110, and the computational module 112. Process 300 may have functions, material, and structures that are similar to the embodiments shown in FIGS. 1-2. Therefore common features, functions, and elements may not be redundantly described here.

Process 300 may begin by determining data recording characteristics associated with a data set such as the data set 200 (task 302). As explained above, the data-recording characteristics may comprise, for example but with limitation, the data subset cardinality, the maximum data time delay offset, the data set size, and the like. Although the sorting technique described below is used to sort instrumentation data using a timestamp as a sorting key, the sorting technique may be applied to other purposes, for example but without limitation, sorting a national database using social security numbers as a sorting key. In one embodiment, the datum may be received from the data sources A/B/C and sorted in real-time. Alternatively the datum may be stored apriori and sorted in non-real time.

Process 300 may then continue by calculating a sort-table size based on the data recording characteristics (task 304) as explained in more detail below in the context of discussion of FIGS. 4 and 6 below.

Process 300 may then continue by sorting the data set 200 based on the sort-table size (task 306) as explained in more detail in the context of discussion of FIGS. 4 and 6 below. Sorting is generally any process of arranging items in some sequence. Sorting can be done based on one or more components or properties of a data set (called a sort key) corresponding to each data item of the data set. If different items have different sort key values then this defines a unique order of the items. A standard order is often called ascending (corresponding to the fact that the standard order of numbers is ascending, i.e. A to Z, 0 to 9), and the reverse order (Z to A, 9 to 0) is often called descending. For example, for books, the sort key may be a title, subject or author, and the order is alphabetical. More than one sort key may be used for each data item. A first is then called a primary sort key; a second is called a secondary sort key; and the like. For example, addresses could be sorted using a city as the primary sort key, and a street as the secondary sort key.

There are number of sorting algorithms, for example but without limitation, bubble sort, insertion sort, heap sort, quick sort and the like, but they are generally not practical for a large data set that approaches or exceeds an available physical memory. If a total data size approaches or exceeds the available physical memory then the computer may spend most of its time swapping data from the hard drive to the memory and little useful work may be done.

Embodiments of the disclosure described herein provide a data partition methodology such that the sorting of a substantially large amount of data can be done quickly on a typical computer, such as but without limitation, a general purpose personal computer (PC) such as a typical office computer, a laptop, a PDA, and the like, that may be used anywhere, such as but without limitation, on-board an aircraft, on ground, in a spacecraft, and the like. Thus, a significant amount of time and cost for sorting a large amount of data may be saved. Any of the sorting algorithms mentioned above may be used for sorting the partitioned data.

In contrast to existing methods, embodiments of the disclosure overlap data sorting and extraction. A data queue is formed in a sort table that holds a "sort-table size" number of datums (or sort keys with pointers). The data queue is a data structure in which the data in the collection are stored in order, and principal operations on the data in the data queue are addition of datums at an "end order position" and removal of datums from the "front order position". The data queue may be implemented by, for example but without limitation, a circular buffer, a linked list, and the like. A sort-table size amount of the data storage module 110 may comprise the sort table comprising the data queue.

The data queue comprises a "queue-size" number of datums. Datums may be added or removed from the data queue and the queue-size changes to reflect a number of datums in the data queue. The queue-size is less than or equal to the sort-table size. Data from the data set 200 is loaded into the data queue when the queue-size is less than a fraction (e.g., half) of the sort-table size. When the data queue is full (i.e., when the queue-size is equal to the sort-table size), the data queue/sort table is sorted. The data is read out of the data queue until the queue-size is again less than a fraction (e.g., half) of the sort-table size. Newly read data from the data set 200 is added to an end fraction (e.g., end half) of the data queue after sorted data is shifted to a front faction (e.g., now the first half) of the data queue. An end fraction (e.g., end half) of the data queue may appear to be sorted twice but that may not occur. Some of the new data from the second fraction just read may need to be sorted, but the entire first half table may not need to be resorted. The second fraction of newly read data must be sorted along with the first half table but there may not be a substantially amount of data swap/movement in the first fraction. The process is explained in more detail in the context of discussion of FIGS. 4 and 6 below.

Figure 4:
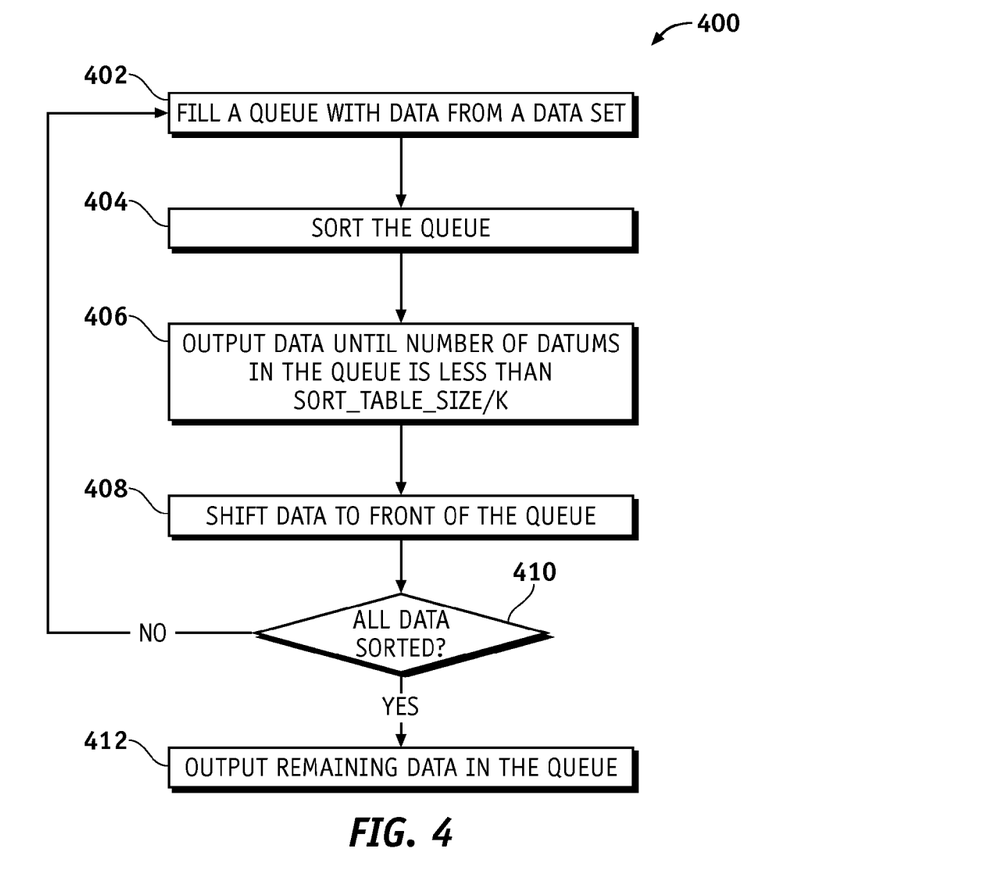
FIG. 4 is an illustration of an exemplary flow chart showing a data sorting process according to an embodiment of the disclosure.

FIG. 4 is an illustration of an exemplary flow chart showing a data sorting process 400 according to an embodiment of the disclosure. The various tasks performed in connection with process 400 may be performed, by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as the computational module 112 in which the computer-readable medium is stored. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. For illustrative purposes, the following description of process 400 may refer to elements mentioned above in connection with FIGS. 1-3. In practical embodiments, portions of the process 400 may be performed by different elements of the data sorting system 100 such as: the data handler module 108, the data storage module 110, and the computational module 112. Process 400 may have functions, material, and structures that are similar to the embodiments shown in FIGS. 1-3. Therefore common features, functions, and elements may not be redundantly described here. Process 400 is described herein in conjunction with FIG. 5.

Figure 5:
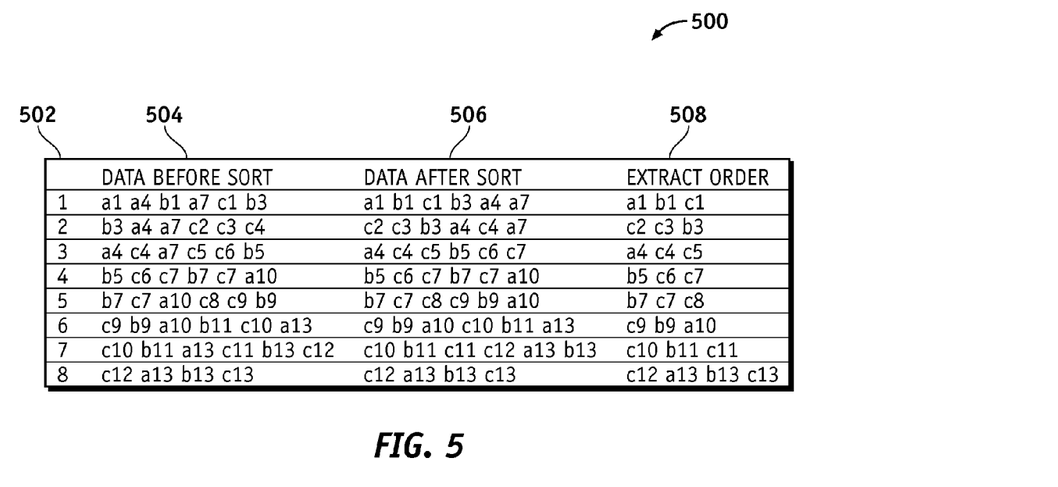
FIG. 5 is an illustration of an exemplary sort-table during iterations of a data sorting process according to an embodiment of the disclosure.

Process 400 may begin by the computational module 112 filling a data queue (not shown) with data from a data set such as the data set 200 (task 402). For example, the data queue may be a part of the data storage module 110 and filled with data read from the data set 200 stored in the data storage module 110. The data set 200 comprises a data sequence of: a1 a4 b1 a7 c1 b3 c2 c3 c4 c5 c6 b5 b7 c7 a10 c8 c9 b9 b11 c10 a13 c11 b13 c12 c13. As shown in FIG. 5, the data queue may be filled with data to comprise a data sequence before sorting 504 of (a1, a4, b1, a7, c1, b3) at a queue state number 502 of 1.

Process 400 may continue by the computational module 112 sorting the data queue (task 404). As shown in FIG. 5, a data sequence after sorting 506 is (a1, b1, c1, b3, a4, a7) at the queue state number 502 of 1. As explained above the data queue may be sorted by any suitable sorting method, for example but without limitation, a bubble sort, an insertion sort, a heap sort, a quick sort, and the like.

Process 400 may continue by the computational module 112 outputting data (e.g., to a file) from the queue until a number of datums in the data queue (queue_size) is less than or equal to a sort-table size/K (task 406). For example, for the sort-table size equal to 6 and K equal to 2, the data is output in an extraction order 508 of (a1, b1, c1) until 3 datums of the data queue are removed and 3 datums remain in the data queue, which is equal to the sort-table size/K. K is a constant, and may be chosen based on the data set size, a memory size (i.e. bytes), a processor speed (e.g., million instructions per second (MIPS)), and the like to, for example but without limitation, minimize a number of calls to a sorting routine, minimize memory usage, balance calls to a sorting routine and memory usage, and the like. A choice of K that balances calls to a sorting routine and memory usage may be chosen by, for example but without limitation, heuristics, experiment, numerical analysis, and the like.

Process 400 may continue by the computational module 112 shifting data in the data queue to a front of the data queue (task 408). As shown in FIG. 5, the data queue may comprise a data sequence after a sort 506 of (a1, b1, c1, b3, a4, a7) at a queue state number 502 of 1. The remaining datums (b3, a4, a7) in the data queue are shifted to a front of the data queue, and new datums (c2, c3, c4) are added from the data set 200. For the next iteration, the queue state number 502 is 2, the data queue contains a data sequence before a sort 504 of (b3, a4, a7, c2, c3, c4). Depending on the queue implementation, shifting of data in the data queue may occur, for example but without limitation, automatically, by changing a data pointer, by compaction, and the like.

Process 400 may continue by the computational module 112 checking if all data in the data set 200 is sorted (inquiry task 410) in the data storage module 110. If all data in the data set 200 is not sorted (No branch of inquiry task 410), the process 400 leads back to the task 402 for the computational module 112 to fill the data queue with data from the data set 200. In this manner, the computational module 112 process 400 continues to iterate until the datums are sorted in the data storage module 110. As shown in FIG. 5, after sorting, the data set 200 comprises: a1 b1 c1 c2 c3 b3 a4 c4 c5 b5 c6 c7 b7 c7 c8 c9 b9 a10 c10 b11 c11 c12 a13 b13 c13. In this manner, the data set is sorted in the chronological order with respect to one another as far as the timestamp (T1, T2 . . . ) is concerned. If all data in the data set is sorted (Yes branch of inquiry task 410), the computational module 112 outputs any remaining data in the data queue (task 412) and process 400 ends.

FIG. 5 is an illustration of an exemplary sort table 500 during iterations of the data sorting process 400 that can be stored in the data storage module 110 according to an embodiment of the disclosure. FIG. 5 comprises a queue state number 502, a data sequence before a sort 504, a data sequence after a sort 506, and an extraction order 508. In this example, sort-table size=6, and K=2, three data subsets a, b and c (FIG. 2) are written to a database in the data storage module 110. The sort-table size is explained in more detail in the context of discussion of FIG. 6 below. A data sequence of an entire data set before sorting comprises: a1 a4 b1 a7 c1 b3 c2 c3 c4 c5 c6 b5 b7 c7 a10 c8 c9 b9 b11 c10 a13 c11 b13 c12 c13. A file pointer for each datum is: p1 p2 p3 p4 p5 p6 p7 p8 p9 p10 p11 p12 p13 p14 p15 p16 p17 p18 p19 p20 p21 p22 p23 p24 p25, respectively.

After a first call (iteration), the file pointer is at p7, data_queue before the sort is a1 a4 b1 a7 c1 b3, data_queue after the sort is a1 b1 c1 b3 a4 a7, and a1 is returned. b1 is returned at a second call, and c1 is returned at a third call.

On a 4th call, the queue_size<=sort-table size/K (e.g., 6/2=3) so the process 400 fills up the data_queue again to b3 a4 a7 c2 c3 c4. The file pointer is at p10 now, and data_queue after sort is c2 c3 b3 a4 c4 a7. c2 is return on the 4th call, c3 is return on the 5th call, and b3 is return on the 6th call.

As mentioned above in the context of discussion of FIG. 4, the process 400 continues to iterate until the datums are sorted in the data storage module 110. After sorting, the data set comprises: a1 b1 c1 c2 c3 b3 a4 c4 c5 b5 c6 c7 b7 c7 c8 c9 b9 a10 c10 b11 c11 c12 a13 b13 c13. In this manner, the data set is sorted in the chronological order with respect to one another as far as the timestamp (T1, T2 . . . ) is concerned.

Figure 6:
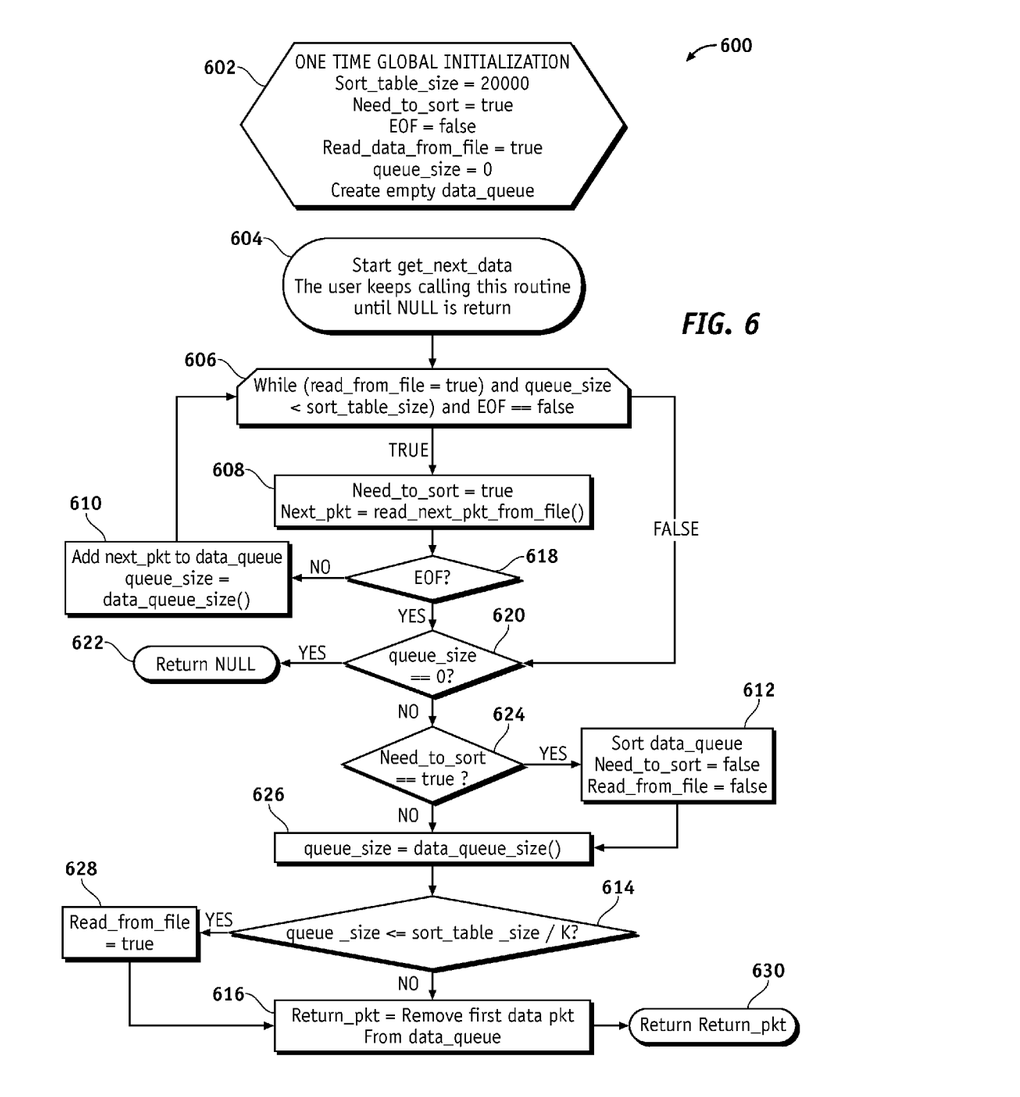
FIG. 6 is an illustration of an exemplary flow chart showing a data sorting process according to an embodiment of the disclosure.

FIG. 6 is an illustration of an exemplary flow chart showing a data sorting process 600 according to an embodiment of the disclosure. The various tasks performed in connection with process 600 may be performed, by software, hardware, firmware, a computer-readable medium having computer executable instructions for performing the process method, or any combination thereof. The process 600 may be recorded in a computer-readable medium such as a semiconductor memory, a magnetic disk, an optical disk, and the like, and can be accessed and executed, for example, by a computer CPU such as the computational module 112 in which the computer-readable medium is stored. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-5. In practical embodiments, portions of the process 600 may be performed by different elements of the data sorting system 100 such as: the data handler module 108, the data storage module 110, and the computational module 112. Process 600 may have functions, material, and structures that are similar to the embodiments shown in FIGS. 1-5. Therefore common features, functions, and elements may not be redundantly described here.

Process 600 may begin by the computational module 112 calculating a sort-table size based on the data recording characteristics (task 602). For example the sort-table size may be calculated based on the following relationship:

$$T = K * M * N,$$

where T is the sort-table size, K is the constant, M is the maximum data time delay offset, and N is a data subset cardinality (number of data sources). For example but without limitation, for K=2, N=100 data sources, and the maximum data time delay offset of M=100, the sort-table size is set to 20000=2*100*100 in a onetime initialization task 602 along with other flags. Although a minimum value of the sort-table size T can be small, in practice a small T value may cause an unnecessary number of calls to a sorting routine. In this manner, the sort-table size is set to some number greater than T that is calculated by the above equation as long as a total memory size for the queue does not approach the physical available memory size of the data storage module 110.

The process 600 may continue by the computational module 112 getting the next data item using a get_next_data( ) function (task 604) until the get_next_data( ) function returns NULL. The get_next_data( ) function returns NULL, if the endof file (EOF) for the data set 200 is reached. Otherwise, the process 600 processes the data returned by the get_next_data( ) function until the get_next_data( ) function returns NULL.

Process 600 may then continue by the computational module 112 checking loop termination conditions (inquiry task 606). The checking loop termination conditions may comprise checking if the read_from_file flag is set to True, checking if the queue_size is less than the sort_table_size (i.e., check if the queue is not full), check if there is more data in the data set 200. If the checking loop termination conditions are not met, the process 600 leads to inquiry task 620.

If the checking loop termination conditions are met, the process 600 may then continue by reading data from the data set 200 stored in the data storage module 110, and setting the need_to_sort flag to true (task 608).

Process 600 may then continue by the computational module 112 checking for EOF for the data set 200. If the EOF is not reached (NO branch of inquiry task 618), then process 600 adds datums such as a1, b1 etc. to the data_queue (task 610) and returns to task 606. If the EOF is reached (YES branch of inquiry task 618), then process 600 continues to inquiry task 620.

Process 600 may then continue by checking if the queue_size is equal to zero (inquiry task 620). If the queue_size is equal to zero (YES branch of inquiry task 620), then a NULL is returned (task 622) and the process 600 terminates. If the queue_size is not equal to zero (NO branch of inquiry task 620), then the process 600 continues to inquiry task 624.

Process 600 may then continue by the computational module 112 checking if the need_to_sort flag is set to true (inquiry task 624). If the need_to_sort flag is not set to true (NO branch of inquiry task 624), then the process 600 continues to task 626. If the need_to_sort flag is set to true (YES branch of inquiry task 624), then the process 600 continues by the computational module 112 sorting the data in the data set 200 and setting both the need_to_sort flag and the read_from_file flag to false (task 612). The need_to_sort flag and the read_from_file flag are set to false so that the subsequence call by the user will not read the data from the data set 200 stored in the data storage module 110.

Process 600 may then continue by the computational module 112 updating the current queue size (task 626), and checking if the queue_size is less than or equal to sort_table_size/K (inquiry task 614). If the queue_size is not less than or equal to sort_table_size/K (NO branch of inquiry task 614), process 600 continues to task 616. If the queue_size is less than or equal to sort_table_size/K (YES branch of inquiry task 614), the read_from_file flag is set to true (task 628) and process 600 continues to task 616.

Process 600 may then continue by the computational module 112 removing the first datum from the data_queue (task 616) and returning the first datum to a calling function (task 630). Thus, each time the process 600 is called by the calling function, either a sorted datum is returned, or a NULL is returned indicating there is no more data.

In this manner, the computational module 112 partitions the data such that a large amount of data is sorted quickly, saving a significant amount of time and memory storage size. In this way, various embodiments of the disclosure provide a means to sort a substantially large amount of data on a small computer with a limited amount of random access memory (RAM). Since an entire data set is not loaded in the memory, virtual memory is not needed for temporary data swapping to RAM from a disk drive. The swapping data between hard disk and RAM are a system bottleneck if the entire data set is loaded into memory. Embodiments of the disclosure provide a technique to sort for example, a 100 GB file with a 3 GB memory. Thereby saving time and cost when sorting a large amount of data.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the terms "computer program product", "computer-readable medium", and the like may be used generally to refer to media such as, for example, memory, storage devices, or storage unit. These and other forms of computer-readable media may be involved in storing one or more instructions for use by the computational module 112 to cause the computational module 112 to perform specified operations. Such instructions, generally referred to as "computer program code" or "program code" (which may be grouped in the form of computer programs or other groupings), when executed, enable the data sorting method of the system 100.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 1 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A data sorting system comprising a computational machine comprising: a processor
   a data handler module operable to determine a maximum data time delay offset of datums in a plurality of data streams of a data set comprising a plurality of data subsets from the data streams, the data set comprising timestamps; and
   a computational module operable to:
      calculate a sort-table size as twice a product of the maximum data time delay offset and number of the data subsets from the data streams, the sort-table size less than a size of the data set; and
      sort the data set by the timestamps based on the sort-table size, the sorting comprising:
         filling a data queue with sort-table size number of datums from the data set in chronologic order from the data subsets, the data queue configured to hold the sort-table size number of consecutive datums;
         sorting the data queue by the timestamps;
         outputting data from the data queue until a number of datums in the data queue is less than or equal to half the sort-table size;
         shifting remaining data in the data queue to a front of the data queue; and
         repeating the steps of filling, sorting, outputting and shifting until the data set has been sorted.

2. The data sorting system according to claim 1, wherein the size of the data set is greater than an available memory size of a data storage module of the computational machine, and the sort-table size is less than the available memory size.

3. The data sorting system according to claim 1, further comprising a plurality of data sources operable to provide the data subsets.

4. The data sorting system according to claim 1, wherein the maximum data time delay offset comprises a largest time difference between each datum of the data streams.

5. The data sorting system according to claim 1, wherein the data streams comprise respective periodic frequencies and each of the timestamps comprises a time when respective datums are sent.

6. The data sorting system according to claim 5, wherein the data streams comprise video data received from a plurality of sensors of one or more vehicles.

7. A computer implemented method of sorting data, the method comprising:
   determining a maximum data time delay offset of datums in a plurality of data streams of a data set comprising a plurality of data subsets from the data streams by action of a computational machine, the data set comprising timestamps;
   calculating a sort-table size as twice a product of the maximum data time delay offset and number of the data subsets from the data streams by action of the computational machine, the sort-table size less than a size of the data set; and
   sorting the data set by the timestamps based on the sort-table size by action of the computational machine, the sorting comprising:
      filling a data queue with sort-table size number of datums from the data set in chronologic order from the data subsets, the data queue configured to hold the sort-table size number of consecutive datums;
      sorting the data queue by the timestamps;
      outputting data from the data queue until a number of datums in the data queue is less than or equal to half the sort-table size;
      shifting remaining data in the data queue to a front of the data queue; and
      repeating the steps of filling, sorting, outputting and shifting until the data set has been sorted.

8. The method according to claim 7, further comprising outputting remaining data from the data queue, if all the data from the data set is sorted.

9. The method according to claim 7, wherein the size of the data set is greater than a memory size of the computational machine and the sort-table size is less than the memory size of the computational machine.

10. The method according to claim 9, wherein the memory of the computational machine is Random Access Memory (RAM).

11. The method according to claim 7, wherein the maximum data time delay offset comprises a largest time difference between each datum of the data streams.

12. The method according to claim 7, wherein the data streams comprise respective periodic frequencies and each of the timestamps comprises a time when respective datums are sent.

13. The method according to claim 12, wherein the data streams comprise video data received from a plurality of sensors of one or more vehicles.

14. A computational machine comprising a non-transitory computer readable medium comprising program code for:
   determining a maximum data time delay offset of datums in a plurality of data streams of a data set comprising a plurality of data subsets from the data streams by action of the computational machine, the data set comprising timestamps;
   calculating a sort-table size as twice a product of the maximum data time delay offset and number of the data subsets from the data streams by action of the computational machine, the sort-table size less than a size of the data set; and
   sorting the data set by the timestamps based on the sort-table size by action of the computational machine, the sorting comprising:
      filling a data queue with sort-table size number of datums from the data set in chronologic order from the data subsets, the data queue configured to hold the sort-table size number of consecutive datums;
      sorting the data queue by the timestamps;
      outputting data from the data queue until a number of datums in the data queue is less than or equal to half the sort-table size;
      shifting remaining data in the data queue to a front of the data queue; and
      repeating the steps of filling, sorting, outputting and shifting until the data set has been sorted.

15. The computational machine according to claim 14, wherein the size of the data set is greater than a memory size of the computational machine and the sort-table size is less than the memory size of the computational machine.

16. The computational machine according to claim 15, wherein memory of the computational machine is Random Access Memory (RAM).

17. The computational machine according to claim 14, further comprising outputting remaining data from the data queue, if all the data from the data set is sorted.

18. The computational machine according to claim 14, wherein the maximum data time delay offset comprises a largest time difference between each datum of the data streams.

19. The computational machine according to claim 14, wherein the data streams comprise respective periodic frequencies and each of the timestamps comprises a time when respective datums are sent.

20. The computational machine according to claim 19, wherein the data streams comprise video data received from a plurality of sensors of one or more vehicles.

* * * * *